June 13, 1933.   A. T. YATES   1,913,579
CLUTCH
Filed March 19, 1931   2 Sheets-Sheet 1

INVENTOR.
Arthur T. Yates
by Parker & Brocknow
ATTORNEYS.

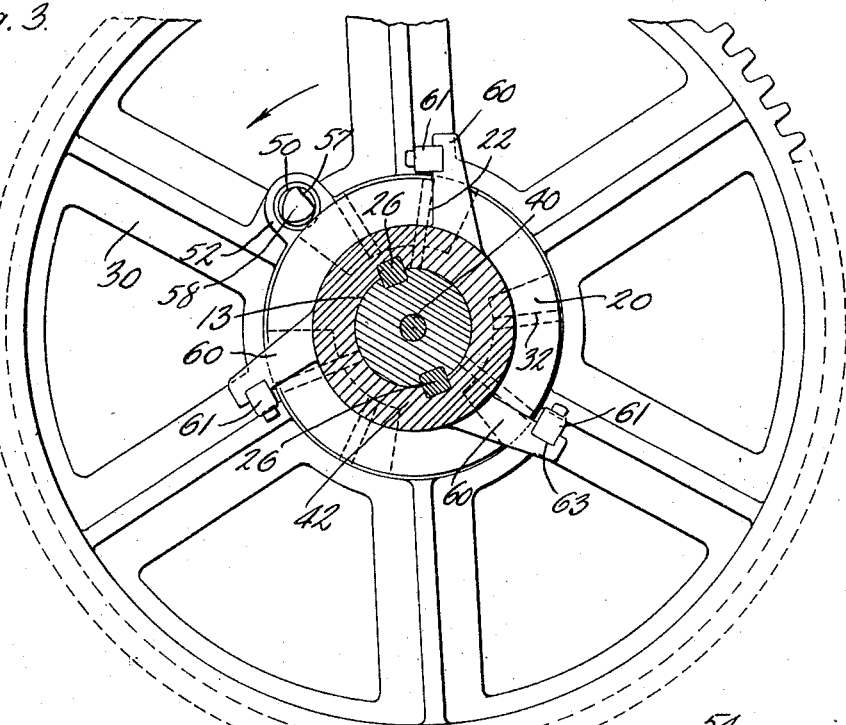
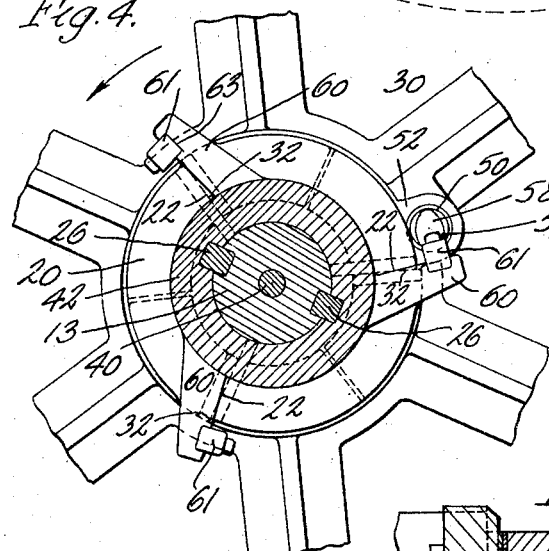
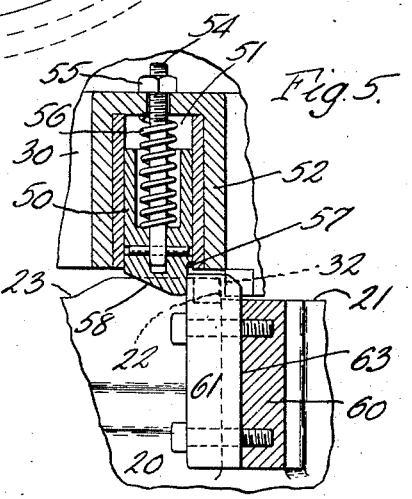
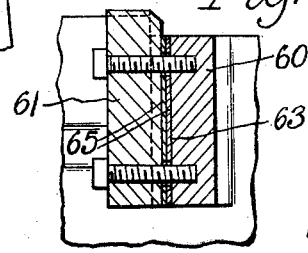

Patented June 13, 1933

1,913,579

UNITED STATES PATENT OFFICE

ARTHUR T. YATES, OF WEST SENECA, NEW YORK, ASSIGNOR TO BUFFALO FORGE COMPANY, OF BUFFALO, NEW YORK

CLUTCH

Application filed March 19, 1931. Serial No. 523,731.

This invention relates to clutches or drive mechanisms, such as are used, for example, on punching, shearing and broaching machines, and other analogous intermittently operated apparatus.

As usually organized, these clutch or drive mechanisms include a drive gear, pulley, or the like, which is arranged to rotate continuously about an intermittently operating shaft to which the punch, broach, shearing knife or the like tool is operatively connected; and one of the two clutch members, namely, the driven member, is splined upon or otherwise connected to said shaft so as to have a limited endwise movement thereon. The driving clutch member, which may be a part of the drive gear or pulley and the driven member are provided with complementary, spaced clutch teeth. Clutches of this kind are actuated by first moving one of the clutch members axially to place the teeth in position for engagement, which engagement is then effected in a rotary direction by the rotation of the driving clutch member, whereupon power from the drive gear or pulley is applied to the shaft through the clutch to rotate the shaft in one direction and cause the tool to operate upon the work. The teeth in clutches of this kind are, therefore, shaped to permit the transmission of power in only one direction of rotation. The clutch teeth can, therefore, separate while the driven member is otherwise in operative relation to the driving member, for example, by over-running of said member. The clutch teeth would also disengage and the clutch run free if the driving member is rotated in the opposite direction.

A generally known fault of clutches or drive mechanism of this kind is that, due to the resistance offered by the interposition of a piece of work beneath the tool, a great amount of momentum stored up in the moving parts of the machine is suddenly released when the work has been severed or other operation thereon completed, thus causing a sudden advance movement to the plunger and other moving parts of the machine. This causes the driven clutch member to move in advance of the driving member so that the clutch teeth momentarily are disengaged. When the driving member again catches up with the driven member, the clutch teeth re-engage with a sudden clash or shock. This is very objectionable, especially on large machines, where the vibration or shock produced by the sudden re-engagement of the clutch is such as to shake the building, in addition to the annoyance caused by the noise. The strain thus produced in the apparatus considerably increases the wear and shortens the life of the parts.

The objects of the present invention are to provide a clutch for machines of the character stated, by the use of which the above mentioned objections are overcome; also to provide a clutch or drive mechanism of this kind of simple, sturdy and durable construction, in which the cost of effecting said results is more than offset by the increased life of the machine on which the clutch mechanism is used; also to provide means for this purpose which is positive in action and which does not interfere with or impede the normal engagement and disengagement of the clutch and proper operation of the machine; and also to construct a clutch mechanism having means for the purpose stated composed of parts which are easily and quickly renewed or replaced when worn; and also to improve clutch mechanisms of this kind in the other respects hereinafter set forth and claimed.

In the drawings:—

Fig. 3 is a transverse vertical section of the clutch mechanism, taken approximately on the line 3—3 of Fig. 1;

Fig. 4 is a similar view, with the parts of the clutch in different relative positions; and Fig. 5 is a fragmentary, detailed cross section showing the movable and stationary stops or abutments of the clutch mechanism in operative engagement.

Fig. 6 is a fragmentary cross section illustrating the adjustability of the stationary stop blocks or abutments of the clutch mechanism.

Figure 1:
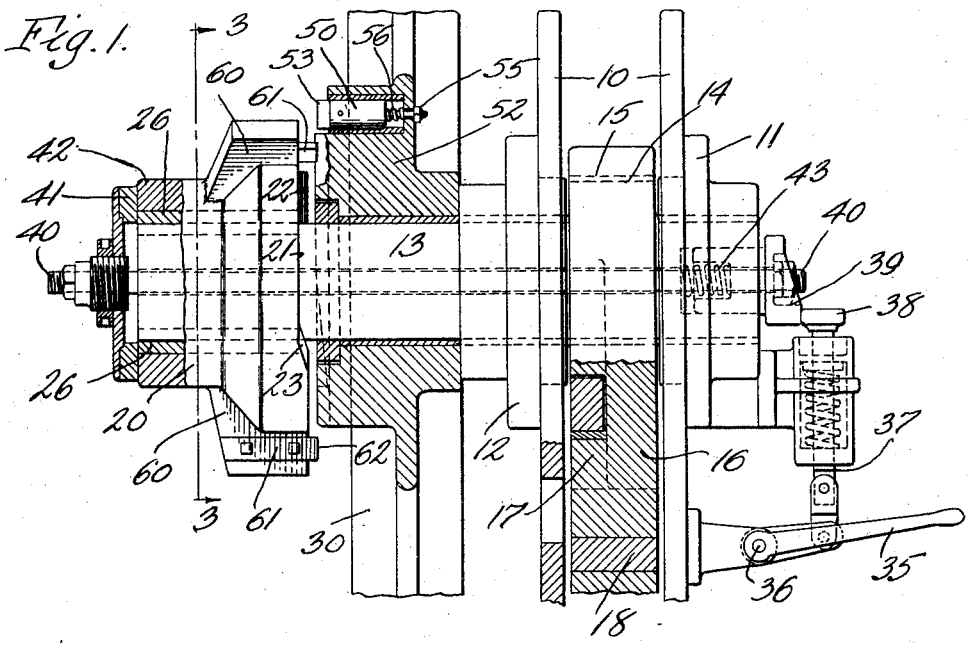
Fig. 1 is a fragmentary vertical section of a shearing machine or apparatus having a clutch mechanism for operatively connecting the driving element to the driven shaft thereof to actuate the shearing knife, and which clutch mechanism is constructed in accordance with an embodiment of this invention.

As before stated, this improved clutch or drive mechanism can be used with various intermittently operated mechanisms of the class stated. In order to illustrate the invention, the same is shown in the drawings in connection with a vertical shearing machine of known construction.

Such portions of this machine as are thought necessary to properly illustrate the use of the invention are shown in Fig. 1, including a stationary upright frame or guide 10 provided with spaced bearings 11 and 12 for supporting the horizontal driven shaft 13 of the apparatus. This shaft is provided with an eccentric 14 fixed thereto, operatively engaging in a bearing 15 in a link or eccentric strap 16 which, in turn, is provided at its lower end with a lateral stud or projection 17. This stud 17 operatively supports a vertically reciprocatory knife-carrying frame or member 18 movable in guides in the frame 10.

At one end of the shaft 13 there is arranged a driven clutch member 20 having a transverse face 21 which is provided with a plurality of projections or clutch teeth having abrupt faces or shoulders 22. The opposite faces 23 of the teeth are inclined, for the purpose hereinafter explained. The clutch member 20 is connected to the shaft 13 by splines or the like 26, which permit the clutch member to have a limited movement lengthwise of the shaft while preventing it from turning relatively thereto.

A driving member, such as a gear wheel 30 or other suitable member, is mounted upon the shaft 13 so as to revolve freely relatively thereto and, as shown, is disposed between the clutch member 20 and the bearing 12.

When the machine is in operation, the driving member rotates continuously, power being applied thereto from any usual or suitable source, not shown.

The driving member 30 is also provided with clutch teeth having abrupt shoulders 32 which are arranged so that they may engage with the abrupt shoulders 22 of the clutch member 20, the opposite face of the teeth of the driving member being preferably inclined as shown at 33. The driving member 30 thus has the driving member of the clutch formed thereon.

The faces 22 and 32 of the teeth of the driving or driven members 20 and 30 respectively, may be formed, as shown, having separate hardened steel blocks or pieces, inserted into recesses in said members, so that they may be renewed when worn.

The clutch member 20 is normally held by suitable means in such relation to the constantly rotating gear wheel 30 that the clutch teeth on the member 30 are retained out of engagement with and can rotate past the teeth 22 of the member 20. When it is desired to engage the clutch to actuate the tool holder 18, the clutch member 20 is moved lengthwise of the shaft 13 towards the driving wheel 30 so as to cause the shoulders 22 and 32 to engage. When this has been effected, the driving wheel or member 30 carries with it the clutch member 20, thereby causing a one-way rotation of the shaft 13 and its eccentric 14 to effect the desired stroke or reciprocation of the shearing knife or other tool.

The clutch may be engaged by any suitable means, such as an operating lever 35 pivoted at 36 on the frame 10 and which is connected to one end of a spring pressed plunger 37. The latter has a stop 38 at the opposite end, and when said lever is moved downwardly, said stop 38 is moved out of engagement with an annular cam member 39 mounted upon one end of a horizontal rod 40. This rod 40 extends centrally lengthwise of the shaft 13 and at its opposite end is provided with a member 41 which is yieldingly pressed against the hub 42 of the clutch member 20 by means of a coil spring 43. When the stop 38 is lowered, as described, the spring 43 causes an endwise movement of the rod 40 and member 41 towards the right in Fig. 1, causing a corresponding movement of the clutch member 20 and permitting the clutch teeth to engage. As soon as the rotation of the clutch member 20 and shaft 13 commences, the lever 35 is released, whereupon the stop 38 is returned to its initial position by its spring. As the rotation of the shaft 13 and attendant stroke of the tool is completed, the cam 39 will reengage the stop 38 and retract and disengage the clutch member 20 from the driving member 30. The inclined faces 23 and 33 of the teeth serve to guide the two clutch members gradually into engagement.

As thus far described, the parts of the apparatus and the clutch or driving mechanism are of known construction, forming of themselves no part of this invention.

In the operation of the machine, as thus organized, and of other machines having reciprocating tools or elements operated intermittently through the alternate engagement and disengagement of a clutch such as described, the tool 18, when engaging and passing through the work, encounters considerable resistance which acts in opposition to the driving force applied to the shaft through the clutch from the driving member. Consequently, there is considerable momentum stored up in the driven clutch member 20, which, when the aforesaid resistance is suddenly removed, due to the completion of the cut or other operation performed by the tool, causes the clutch member to become disengaged from and race ahead of the driving member momentarily with consequent separation of the driving faces 22 and 32 of the clutch teeth. As soon as the speed of the clutch member is reduced to a point where the speed of the driving member 30 causes it to again catch up with the clutch member 20, the clutch teeth of the driving and driven members will re-engage with a sudden clash or shock with consequent noise, vibration and wear upon the parts of the apparatus.

In order to overcome these objections, means are provided in the form of engaging or abutting stops or parts on the driving and driven members respectively, which are adapted to engage at the moment that the clutch teeth of these members start to separate, as for example, after the completion of the cut or other work, as described above.

Figure 2:
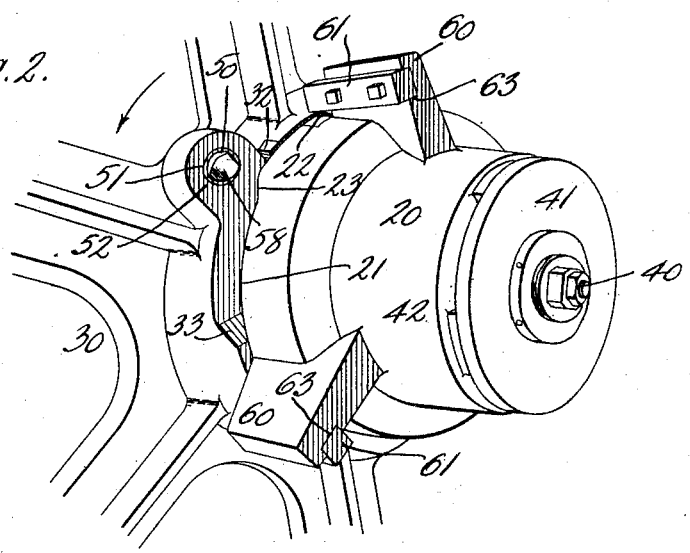
Fig. 2 is a fragmentary perspective view of the clutch mechanism.

In the embodiment of the invention illustrated in the drawings, one of the clutch members, for example, the driving member or gear wheel 30 is provided with a bolt, stop, or latch 50 which is preferably retractable and is disposed in parallel relation to the axis of the shaft 13 is a cavity 51 formed in a suitable boss or projection 52 on that side of the driving member 30, which faces the clutch member 20. The stop 50 is arranged to move yieldingly lengthwise of the hole 51, with one end 53 normally projecting beyond the face of the boss 52, as shown in Figs. 1, 2 and 5. The stop 50 may be adjusted to project to any desired extent, by means of a threaded rod 54 pinned thereto, and which extends through a hole in the rear of the boss 52 and receives an adjusting nut 55. A spring 56 surrounds the rod 54 within the recess 51, and, bearing at its opposite ends against the bolt or stop 50 and the bottom of the recess 51 respectively, acts to hold the stop 50 yieldingly in its projecting position.

The projecting end of the bolt or stop 50 is formed at one side thereof with a flat radially extending stop face 57 and at its opposite side with an inclined or cam face 58.

The other clutch member, for example, the driven clutch member 20, is provided with a plurality of radial arms or projections 60, preferably corresponding in number to the number of clutch teeth or driving faces 22 thereon, which, in this case, is three. Each of these arms 60 is provided with a fixed lateral projection or stop 61 which extends beyond the face of the member 20 towards the driving member 30. Preferably, these stops 61 are formed of separate hardened steel blocks bolted or otherwise removably secured in recesses 63 in the arms 60, so that they may be renewed when worn. These stops may be constructed or mounted upon the clutch member 20 in any other suitable way.

The fixed stops 61 of the clutch member 20 are preferably disposed at the same distance from the axis of the shaft 13 as is the movable stop 50 of the driving member 30.

In the position of the parts in which the driving member 30 is running free, the ends of the stops 61 clear the end of the movable stop 50, but as the clutch member 20 is shifted into operative relation with the driving member 30, the stop 50 on the latter will be moved into the path of the stops or blocks 61 on the clutch member 20. The latch member 50 and the members 61 are so positioned with relation to the driving faces 22 and 32 of the clutch teeth, that one of the stop members 61 will move into engagement with the inclined face of the latch 50 just before the driving faces 22 and 32 enter into engagement, and the stop member 61 will clear the latch member 50 and permit it to snap back into its outer position just as the driving faces 22 and 32 contact. The latch and stop member will, therefore, prevent any substantial movement of the driving faces of the clutch away from each other, since immediately upon the release of the resistance to the movement of the tool carrying member by the work, the driving faces 22 and 32 will tend to separate, due to the tendency of the driven clutch member to race or overrun the driving member. When this occurs, the opposing faces 57 and 62 of the stops 50 and 61 immediately engage, see Figs. 4 and 5, thereby retaining the driving and driven members substantially in operative relation, and preventing the clutch member 20 from racing ahead of the driving member. This, of course, also eliminates the noise and vibration resulting from the re-engagement of the driving faces 22 and 32.

While the latch member 50 may be of any suitable or desired construction, it is desirable to have this member arranged to move in a direction substantially parallel to the axis of the clutch, since this enables the latch to engage the stop member 60 in such a manner that the stop and latch will engage upon a very small relative movement of the clutch members in the reverse direction. By making the stop member 61 separate from the arm 60 and securing the same to the arm, the position of the stop member may be adjusted by the use of shims or spacing pieces 65, see Fig. 6, to compensate for wear in the clutch and to obtain the desired relationship between the driving faces 22 and 32 of the clutch members and the contacting faces of the stop and latch.

From the foregoing, it will be apparent that, in addition to the use of the stops 50 and 61 for the purpose just described, the clutch, after being positively engaged and retained in operative relation by the stops, can be rotated in the opposite direction by reversing the direction of rotation of the driving member 30. The clutch members may be moved or shifted out of engagement in the usual manner, which shifting also disengages the stop members 50 and 61.

I claim as my invention:

1. A clutch having a driving and a driven member provided with cooperating clutch parts engageable for effecting positive drive of the driven member in one direction, and which are separable when said driven member advances relatively to said driving member, a spring pressed latch on one of said clutch members which extends parallel to the axis of rotation of said clutch, a stop on the other clutch member which, in the movement of said clutch members into operative relation is engageable with and retracts said latch so as to pass thereby, and which, as said clutch parts engage, passes over said latch and permits the latter to immediately engage behind said stop to prevent subsequent separation of said clutch parts during the driving movement, and said stop being adjustably and removably secured to said clutch member so as to enable its operative relation to said latch to be effected and maintained in use and replacement made to compensate for excessive wear.

2. A clutch having a driving and a driven member provided with cooperating clutch parts engageable for effecting positive drive of the driven member in one direction and which are separable when said driven member advances relatively to said driving member, a spring pressed latch on one of said clutch members which extends parallel to the axis of rotation of said clutch, an arm on the other clutch member, a stop block removably secured to said arm and also extending parallel with the axis of rotation of said clutch and which in the operative engagement of said clutch members is engageable with and retracts said latch so as to pass thereby, and which, as said clutch parts engage, passes over said latch and permits the latter to immediately engage behind said stop to prevent subsequent separation of said clutch parts during the driving movement, and said stop block being adjustable circumferentially of said clutch to permit the same to be accurately initially adjusted relative to the position of said latch, and also for retaining the stop block in accurate operative relation to said latch and to said clutch driving parts so as to compensate for wear in use.

ARTHUR T. YATES.